United States Patent [19]
Stuhler

[11] Patent Number: 4,609,083
[45] Date of Patent: Sep. 2, 1986

[54] REACTIVE ATTITUDE STABILIZATION SYSTEM

[76] Inventor: William B. Stuhler, 1908 Edgewater Dr., Plano, Collin County, Tex. 75075

[21] Appl. No.: 480,834

[22] Filed: Mar. 31, 1983

[51] Int. Cl.[4] .......... H01Q 1/18; F16F 7/10

[52] U.S. Cl. .......... 188/378; 343/765; 343/709; 248/184; 114/191

[58] Field of Search .......... 343/757, 759, 763, 765, 343/766, 880, 882, 709; 248/182, 184, 284, 286, 292.1, 291, 559, 562, 564, 565, 567, 581, 582, 280.1, 288.1; 74/1 R, 5.22, 5.41, 5.6, 5.44, 574; 188/378-380; 267/136, 140.1, 140.5; 114/191, 193, 195

[56] References Cited

U.S. PATENT DOCUMENTS

| | | | |
|---|---|---|---|
| 1,260,181 | 3/1918 | Garnero | 248/182 |
| 1,324,478 | 12/1919 | Tanner | 74/5.44 |
| 1,569,325 | 1/1926 | Leib | 343/882 |
| 1,932,469 | 10/1933 | Leib et al. | 250/11 |
| 2,425,737 | 8/1947 | Hanna et al. | 172/239 |
| 2,475,746 | 7/1949 | Kenyon | 250/33.65 |
| 2,477,574 | 8/1949 | Braddon | 74/5.6 |
| 2,901,208 | 8/1959 | Jones | 248/346 |
| 3,218,015 | 11/1965 | Baer | 248/184 |
| 3,358,285 | 12/1967 | Van Der Wal | 343/709 |
| 3,548,972 | 12/1970 | Flannelly | 188/380 |
| 3,765,631 | 10/1973 | Herbst et al. | 248/184 |
| 3,789,414 | 1/1974 | Bauer et al. | 343/761 |
| 3,860,931 | 1/1975 | Pope et al. | 343/709 |
| 3,893,123 | 6/1975 | Bieser | 343/706 |
| 3,968,496 | 7/1976 | Brunvoll | 343/765 |
| 4,020,491 | 4/1977 | Bieser et al. | 343/765 |
| 4,193,308 | 3/1980 | Stuhler | 74/5.22 |

FOREIGN PATENT DOCUMENTS

| | | | |
|---|---|---|---|
| 2702340 | 7/1978 | Fed. Rep. of Germany | 343/765 |

*Primary Examiner*—Eli Lieberman
*Assistant Examiner*—Michael C. Wimer
*Attorney, Agent, or Firm*—Richards, Harris, Medlock & Andrews

[57] ABSTRACT

A reactive attitude stabilization system to be carried by a vehicle is provided where a first shaft is pivotally mounted on the vehicle in a normally horizontal relation. A second shaft is supported in horizontal relation at its midpoint by the first shaft and oriented perpendicular to the first shaft. Nonrotating slide bearings support a platform on the second shaft for translation of said second shaft relative to the platform. Resilient members oppose translation of the second shaft relative to the platform in either direction and normally maintain the intersection of the axes of the first and second shafts vertically above the center of gravity of the platform. An acceleration induced shift of the second shaft axially and horizontally relative to said platform causes a torque due to gravity to counteract the acceleration dependent torque.

7 Claims, 5 Drawing Figures

REACTIVE ATTITUDE STABILIZATION SYSTEM

TECHNICAL FIELD

This invention relates to the stabilization of a platform mounted on a vehicle which subjects the platform to angular and linear accelerations. In a more specific aspect, a slide mounting is provided in such a manner as to react to stabilize the platform.

BACKGROUND ART

Satellite communication terminals aboard various vehicles including ocean going vessels and land based units require stabilization of instrument platforms. Such operations take place in environments where motion of pitch and/or roll are present.

There are many instances where antennas and various instrumentation are required to be stabilized against motion disturbances encountered on moving vehicles. These applications include, but are not limited to, satellite antennas, microwave antennas, radar antennas, navigation equipment, cameras and various optical and positioning devices. The vehicles aboard which these systems might be used include commercial and military land vehicles, ships, aircraft and missiles.

There are two general types of vertical stabilization systems in use:

1. Closed loop servo systems which use servo motors, servo amplifiers, angular transducers and vertical references (usually small vertical gyros) to sense angular displacements of the vehicle and make the necessary corrections for each axis.

2. Direct mechanical stabilization systems, which use two or four large flywheel assemblies acting as direct-acting gyros. The following patents relate to direct mechanical stabilization systems:

U.S. Pat. No. 3,893,123
U.S. Pat. No. 4,020,491
U.S. Pat. No. 4,193,308
U.S. Pat. No. 4,197,548.

DISCLOSURE OF THE INVENTION

A reactive attitude stabilization system to be carried by a vehicle is provided in which a first shaft is pivotally mounted on the vehicle in a normally horizontal position. A second shaft is supported in horizontal relation at its midpoint by the first shaft and is oriented perpendicular to the first shaft. Slideable nonrotating bearing means supports a platform on the second shaft for translation along the second shaft. Resilient means opposes translation of the platform in either direction along the second shaft and normally maintains the intersection of the axes of the first and second shafts vertically above the center of gravity of the platform whereby an acceleration induced shift of the second shaft axially and horizontally relative to the platform causes a torque due to gravity to counteract the acceleration dependent torque which acts on the center of gravity and which tends to displace the platform. In a multiaxis form, third and fourth horizontal shafts are supported, one from each end portion of the second shaft with the platform mounted on slideable nonrotating bearing means provided on the third and fourth shafts.

DETAILED DESCRIPTION

Figure 1:
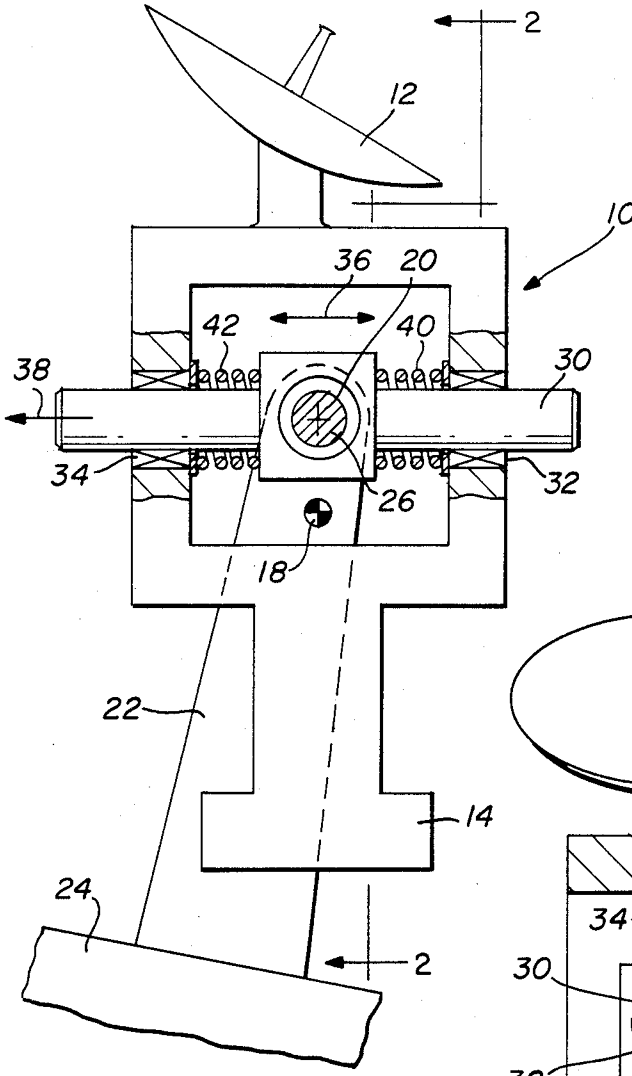
FIGS. 1 and 2 illustrate a single axis stabilization system.

Referring now to FIG. 1, a platform 10 which is to be stabilized comprises a rectangular frame open at the center. On the top portion of platform 10 is mounted a representative load, an antenna 12. A counterweight 14 is shown forming part of the platform 10 and is located below the rectangular portion. The platform with its counterweight 14 is formed such that the center of gravity 18 of the platform and its load is located vertically below the pivotal axis 20. Platform 10 is supported on a shaft 26 which extends from the upper end of an arm 22 which is secured at its base to a vehicle represented by the body 24.

Figure 2:
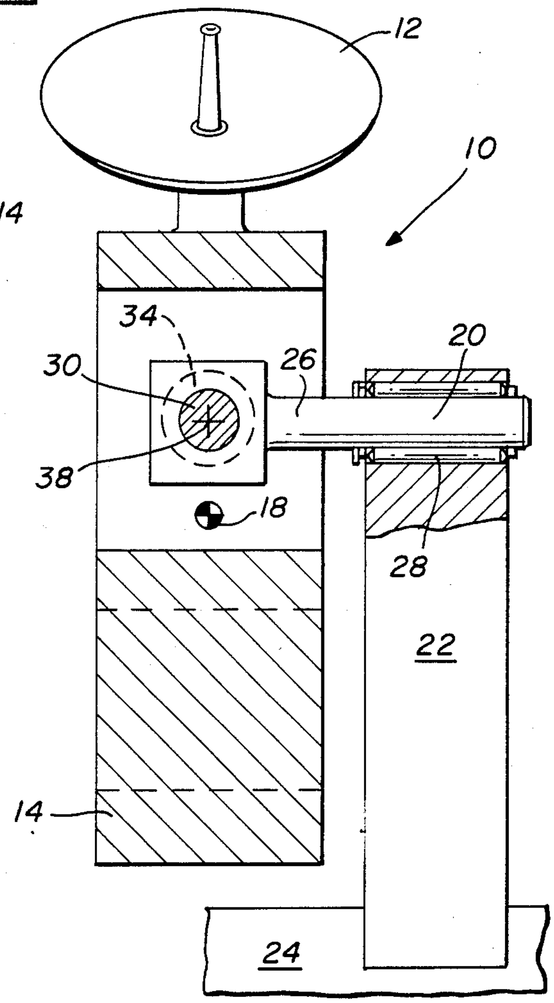

As best shown in FIG. 2, shaft 26 is mounted in an anti-friction pivot bearing 28 which is mounted at the upper end of the arm 22. Shaft 26 normally is horizontal and will be so described for the purpose of the following explanation.

A shaft 30 is coupled at its midpoint to and is integral with shaft 26. Shaft 30 also is horizontal and is perpendicular to shaft 26. Shaft 30 supports platform 10 by way of bearing 32 on one end and bearing 34 on the other end. The bearings 32 and 34 are mounted in suitable apertures in the vertical arms of the platform 10. Shaft 30 extends horizontally both directions from its junction with shaft 26.

Bearings 32 and 34 are of unique character. They are linear ball bearings which permit non-rotative sliding movement of the platform 10 along shaft 30 and relative to shaft 26. The slide motion in either direction is indicated by arrow 36. Thus, if there is acceleration of arm 22 mounted on vehicle 24 in the direction of arrow 38 a shift will result in the location of the center of gravity 18 to the right when shaft 26 moves to the left relative to the platform 10.

Linear springs 40 and 42 surround shaft 30. They oppose movement of shaft 26 in either of the directions indicated by arrow 36 depending upon accelerations of vehicle 24. Due to inertia, the platform 10, including antenna 12 with its load and weight 14, opposes acceleration. As the center of gravity 18 is displaced from a position vertically below axis 20 of shaft 26, a torque is produced by the vertical force due to gravity which tends to oppose the torque produced by the horizontal acceleration.

Thus, in its simplest form, the invention involves stabilization of platform 10 which is pivoted about horizontal axis 20 and which is suspended by low-friction linear sliding bearings 32 and 34 to permit it to shift horizontally in either direction, the movement being perpendicular to the pivot axis 20. This horizontal motion is restrained by linear elastic members or springs 40 and 42. The springs 40 and 42 maintain the spring-mass system in equilibrium position unless and until any external force is applied. The center of gravity of the stable platform when in the equilibrium condition is located slightly below the pivot axis 20, which causes the platform always to assume normal or vertical position due to gravity.

Thus, by the present invention, the angular relationship between the platform 10 and the direction of gravity is automatically maintained. This is so when the horizontal acceleration forces in the direction of arrow 36 are encountered upon movement of the vehicle 24. Such acceleration forces will be present due to turning maneuvers and or whipping action of the ships masts on which antennae may be mounted.

Stabilization is accomplished by permitting linear displacement of the entire platform and its load. The center of gravity of the suspended spring-mass system shifts horizontally. This in turn causes a torque due to gravity about the pivot axis which is opposite and can be made nearly equal to the torque caused by horizontal accelerations acting on the center of gravity.

It will be recognized that the system shown in FIGS. 1 and 2 is a single axis reactive stabilization system. It is self stabilizing and requires no external inputs.

Recapping, a first shaft 26 is pivotally mounted on vehicle 24 as to be normally horizontal. A second shaft 30 is supported in horizontal relation at its midpoint by the first shaft 26 and is oriented perpendicular to shaft 26. Slide bearing means 32, 34 support the platform 10 on the second shaft 30 for translation along the second shaft. Resilient means 40, 42 oppose translation of the second shaft 30 in either direction relative to the platform and normally maintain the intersection of the axes of the first and second shafts vertically above the center of gravity of the platform 10 whereby an acceleration induced shift of said second shaft axially and horizontally relative to said platform causes a torque due to gravity to counteract the acceleration dependent torque which acts on the center of gravity and which tends to displace the platform. The bearing means 32, 34 inhibit rotation of the platform 10 relative to the second shaft 30. Platform 10 has a central bay through which shaft 30 passes with resilient means 40, 42 surrounding shaft 30 and engaging platform 10 with opposed forces such that the intersection of the axes of shafts 26 and 30 lies normally vertically above the center of gravity of platform 10. Shaft 30 is pivotally supported by shaft 26 for rotation on bearing 34 about the axis of shaft 30 and relative to shaft 26.

It will also be recognized that in FIG. 1 the relative size of the antenna 12 relative to platform 10 and the bearing structures has been made out of proportion in order to illustrate the principle involved.

It will now be appreciated that unlike other methods, the present system does not require any high speed rotating components such as gyros, servo motors or direct acting flywheels. It does not require any electrical components at all and, consequently, does not need electrical power. Costs are reduced significantly, reliability is improved and use of the system is permitted where available electric power is limited.

Another significant advantage of this invention is that it compensates for vertical errors caused by horizontal accelerations such as those encountered during sustained turning maneuvers of a vehicle. Direct mechanical stabilization systems cannot tolerate such conditions without significant error. For example, a ship turning at a sustained rate of 3.0° per second with a forward speed of 25 knots will cause a vertical error of 3.9° in a direct mechanical stabilization system due to finite limitations of its inertial capacity. The system of the present invention does not exhibit such errors.

One key to the successful operation of the present invention is the use of linear ball bearings which are anti-friction bearings that permit slide movement of the shaft 30 through bearings 32 and 34. The linear displacement is necessary. Suitable bearings may be of the type manufactured and sold by Thompson Industries, Inc. of Manhasset, N.Y. and identified as Super Ball Bushing Bearings.

Figure 3:
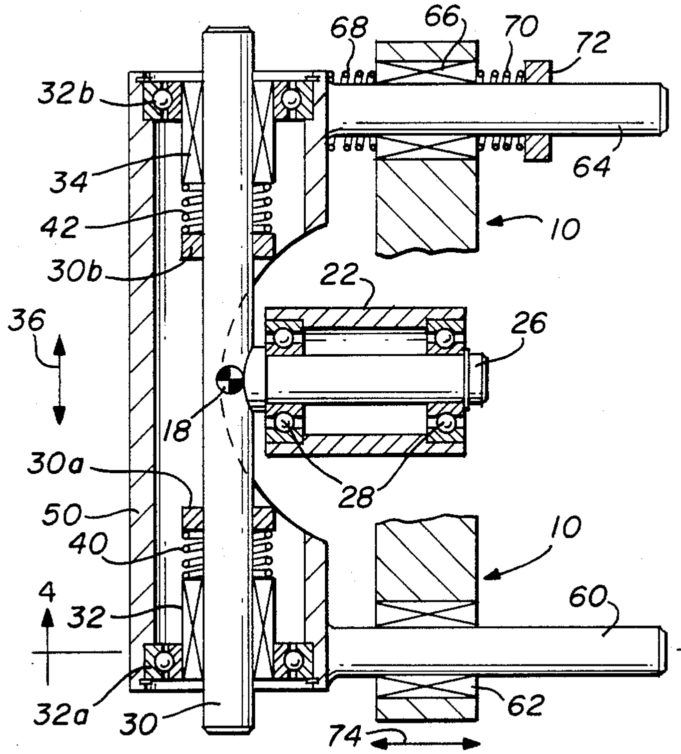
FIG. 3 is a top view of a two axis stabilization system.
Figure 4:
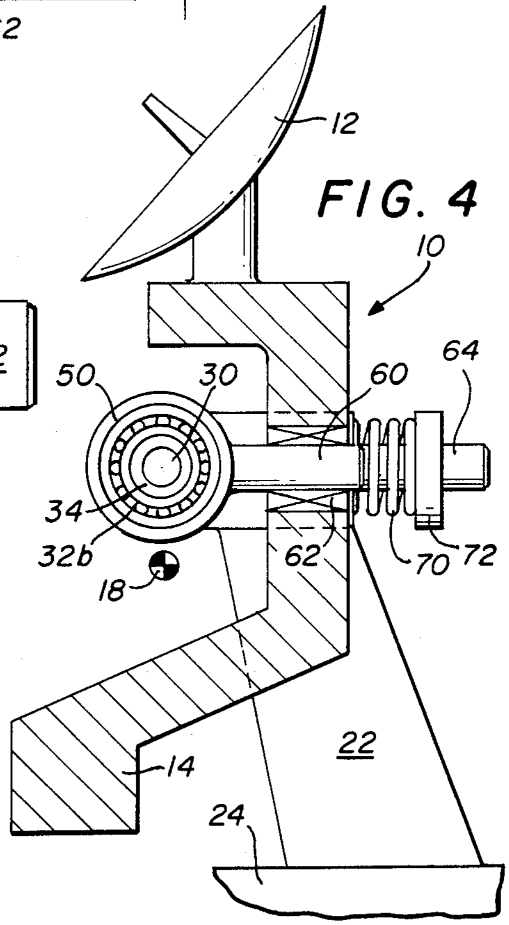
FIG. 4 is a sectional view taken along lines 4—4 of FIG. 3.

Referring now to FIGS. 3 and 4, a two-axis system is shown. The basic principle of the single axis system is here extended to a second horizontal axis which is perpendicular to the first axis. This provides a self-stabilizing two-axis platform capable of isolating instrumentation against both pitch and roll motions as encountered in various vehicles and vessels. This is accomplished to a high degree of accuracy without the use of complex servo systems, gyros or any other electrical components.

In FIGS. 3 and 4 the same reference characters as have been used where corresponding parts are found in FIGS. 1 and 2.

Shaft 26 is mounted at the upper end of arm 22 which is mounted on the vehicle 24. Shaft 26 is horizontal. Shaft 30 is connected to the end of shaft 26 with shaft 26 being mounted in anti-friction bearings 28. Shaft 30 is slideably mounted on linear bearings 32 and 34. In this embodiment, linear bearing 32 is mounted for rotation in bearings **32*a* at one end of a cylinder 50 shown as having an arcuate cutaway side opening through which shaft 26 extends. Spring 40 is mounted near one end of shaft 30 between the end of linear bearing 32 and a stop ring 30*a*. Bearing 34 is mounted for rotation in bearing 32*b*. Spring 42 is mounted near the other end of shaft 30 between the end of the linear bearing 34 and a stop ring 30*b***.

A shaft 60 extends from the end of cylinder 50 and supports platform 10 by means of linear bearing 62. Bearing 62 is mounted in an arm forming part of the stabilized platform 10. In a similar manner, a second shaft 64 extends from the opposite end of cylinder 50. The axis of shaft 26 is horizontal relative to the vehicle's normal attitude only but not stabilized relative to the horizon. The axes of shafts 30, 60 and 64 are stabilized relative to the horizon and thus are all horizontal shafts. Shaft 64 supports linear bearings 66. Spring 68 is mounted between frame member 50 and one end of bearing 66. Spring 70 is mounted between the other end of bearing 66 and stop ring 72. Platform 10 is shaped with counterweight 14 so that the center of gravity 18 is vertically below the axis of shaft 30 where it intersects the axis of shaft 26.

Upon acceleration in the direction of arrow 36, the platform 10 will tend to remain fixed whereas the shafts 26 and 30 will move resulting in a displacement of the center of gravity from a location vertically below the axis of shaft 26. In contrast, upon accelerations of the shaft 26 in the direction of arrow 74, the stabilized platform will tend to remain fixed whereas shafts 26, 30, 60 and 64 will move relative to the platform, thus causing the center of gravity to be removed from a position directly under the intersection of the axes of shafts 26 and 30, thereby creating a reactive torque.

Having described a single axis and a two-axis system, it is anticipated that the invention, in addition to use as a stabilizing system for instrumentation directly, also can be used as a vertical reference feedback device for servo systems. In such case, it would rotationally position one or more transducers, such as synchros, potentiometers, or digital transducers, which in turn would provide an error signal to a servo system to actively stabilize instrumentation using servo motors, gear trains, etc.

It is to be noted that linear bearings 32, 34, 62 and 66 that utilize balls have been discussed. Other types of low friction linear motion devices, linkage mechanisms, or gas bearings might also be used.

Recapping, a first shaft 26 is mounted on vehicle 22 for rotation about a normally horizontal axis. Shaft 30 is supported in horizontal relation at its midpoint by shaft 26 and is oriented perpendicular to shaft 26. An intermediate frame 50, shown as a cylinder, extends along and is mounted on shaft 30 for translation parallel to the axis of shaft 30 and for rotation about the axis of shaft 30. Two normally horizontal shafts 60, 64 extend from intermediate frame 50 parallel to shaft 26 and at points normally equidistant from shaft 26 and with the axes of all shafts 26, 30, 60, 64 normally in the same plane. Slide bearings 62, 66 support platform 10 on shafts 60, 64. Resilient means 40, 42 on shaft 30 and means 68, 70 on shaft 64 normally oppose translation of shaft 30 and shafts 60, 64 relative to platform 10 in the direction of the axis of shaft 30 and in the direction of the axes of said two shafts 60, 64 normally to maintain the center of gravity of platform 10 vertically below the intersection of the axes of shafts 26 and 30.

Intermediate frame 50 comprises a cylinder having rotational bearings **32*a*, 32*b* at the ends thereof. Shaft 30 has slide bearings journaled in rotational bearings 32*a*, 32*b* which engage shaft 30 for rotation relative to the axis of cylinder 50. Shafts 60, 64 extend from the walls of cylinder 50 adjacent opposite ends thereof. Cylinder 50 is partially cut away intermediate its length in the region of coupling of shaft 30 to shaft 26. Springs 40, 42 on shaft 30 are mounted to bear against said slide bearings 32, 34 to urge intermediate frame 50 in opposite directions away from shaft 26**.

Further, rearrangement and inversion of various parts may be possible. For instance, when a shaft is shown to be stationary relative to a housing which is the movable member, it is obvious that the housing could be made stationary with the shaft providing relative motion.

Further, it is possible to provide for a part of the platform (instead of the entire platform) to slide horizontally while being opposed by resilient means to accomplish the same objective. In such an embodiment, the magnitude of the linear motion required must be increased proportionally to the ratio of the total pivoted platform weight divided by the weight of the sliding portion.

Referring again to FIGS. 3 and 4, it will be noted that shaft 30 as well as shaft 26 are parts of the pendulum supported by the arm 22. However, they do not shift relative to arm 22. Thus, it will be appreciated that shafts 26 and 30 are nonslideable parts of the pendulum and that other parts of the platform also may be mounted in a nonslideable manner. Thus only a part of the platform, instead of the entire platform, needs to be mounted for a slide movement horizontally in opposition to the resilient means. In such case, the magnitude of the linear motion required to generate an adequate reactive torque would have to be increased in proportion to the ratio of the total pivoted platform weight divided by the sliding portion weight.

Figure 5:
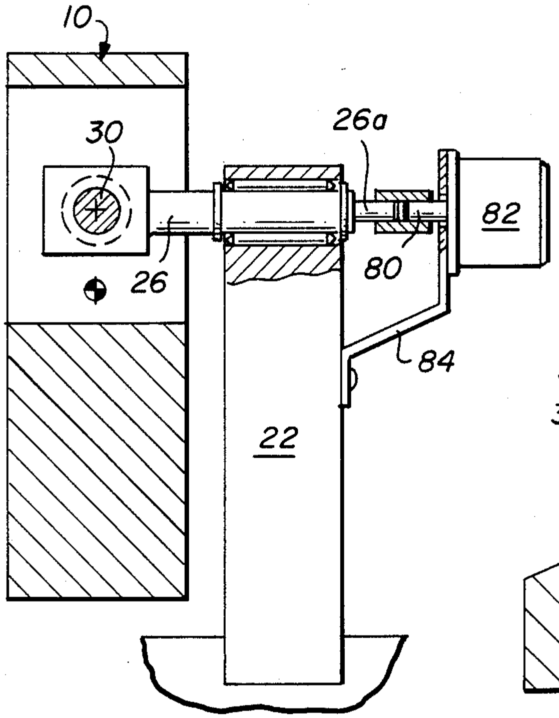
FIG. 5 illustrates the platform control of an angular position transducer.

In FIGS. 1, 2 and 4 an antenna 12 has been shown as the load on platform 10. The description has been directed towards utilization of the antenna 12. It is to be understood that the stabilized platform may be utilized differently than shown in FIGS. 1, 2 and 4. More particularly, as shown in FIG. 5, the stabilized platform 10 is mounted on horizontal shaft 30 which in turn is supported by the pivoted shaft 26. Platform 10 does not support an antenna. Rather it is coupled through an extension **26*a* of shaft 26 to the input shaft 80 of an angular position transducer. The transducer 82 is mounted by a bracket 84 of arm 22. The angular position transducer 82** may be a potentiometer, a synchro, or an optical encoder, such as are well known and used widely for angular position detection.

It should be noted that the type of system described herein can also be supplemented with direct acting flywheels to further improve stability. Such a combination can achieve stabilization performance levels superior to even the more sophisticated servo type systems. This performance is feasible because the required inertial capacity for any given set of conditions would be reduced by two orders of magnitude as compared to a conventional direct mechanical stabilization system.

Having described the invention in connection with certain specific embodiments thereof, it is to be understood that further modifications may now suggest themselves to those skilled in the art and it is intended to cover such modifications as fall within the scope of the appended claims.

I claim:

1. A reactive attitude stabilization apparatus for use with a moving vehicle, comprising:

a platform to be stabilized having a center of gravity;

a first shaft pivotally mounted on the vehicle and defining a first axis which is normally horizontal;

a second shaft supported by said first shaft and defining a second normally horizontal axis which intersects said first axis at a point located vertically above said center of gravity of said platform in the absence of acceleration forces;

slide bearing means for mounting said platform on said second shaft, said slide bearing means enabling vehicle acceleration forces to induce a translation of said platform along said second axis, thus displacing said center of gravity to obtain a torque about said first axis due to gravitational force to counteract a torque about said first axis due to acceleration force, thereby stabilizing said platform; and resilient means for opposing translation of said platform in either direction along said second axis to define an equilibrium position wherein said platform center of gravity is located vertically below said intersection of said first and second horizontal axes.

2. The reactive attitude stabilization apparatus of claim 1 wherein said slide bearing means inhibit rotation of said platform about said second shaft.

3. The reactive attitude stabilization apparatus of claim 1 wherein said second shaft is pivotally supported by said first shaft for rotation about said first axis.

4. A reactive attitude stabilization system to be carried by a moving vehicle, comprising:

a first shaft pivotally mounted on the vehicle and defining a first axis which is normally horizontal;

a second shaft supported by said first shaft and defining a second normally horizontal axis having a perpendicular intersection with said first axis;

a platform mounted on said second shaft and including nonrotatable slide bearing means for translation of said platform along said second axis, said platform having a center of gravity normally located vertically below said intersection of said first and second axes;

said nonrotatable slide bearing means enabling vehicle acceleration forces to induce a translation of said platform along said second axis, thus displacing said platform center of gravity from vertically below said intersection to obtain a torque about said first axis due to gravitational force so as to counteract rotation of said platform about said first axis due to vehicle acceleration force; and resilient means for opposing axial translation of said platform in either direction along said second axis to define an equilibrium position wherein said platform center of gravity is located vertically below said intersection of said first and second horizontal axes.

5. A reactive multi-axis attitude stabilization system to be carried by a moving vehicle, comprising:

a first shaft pivotally mounted on the vehicle for rotation about a first axis which is normally horizontal;

a second shatf supported by said first shaft and defining a second normally horizontal axis having a perpendicular intersection with said first axis;

an intermediate frame rotatably and slideably mounted on and extending along said second shaft for rotation about and translation along said second axis;

third and fourth normally horizontal shafts defining third and furth axes, respectively, extending from said intermediate frame, parallel to and normally equidistant form said first shaft, said first, second, third and fourth axes all lying in the same plane;

a platform to be stabilized having a center of gravity normally located vertically below said intersection of said first and second axes;

slide bearing means for mounting said platform on said third and fourth shafts; and resilient means on said second shaft and on at least one of said third and fourth shafts opposing translation of said intermediate frame along said second axis and of said platform along said third and fourth axes, respectively, to define an equilibrium position wherein said platform center of gravity is located vertically below said intersection of said first and second horizontal axes.

6. The reactive multi-axis attitude stabilization system of claim 5 wherein said intermediate frame comprises a cylinder having rotational bearings at the ends thereof, wherein said cylinder has slide bearings journaled in said rotational bearings engaging said second shaft for rotation of said cylinder about said second axis, wherein said third and fourth shafts extend from opposite ends of said cylinder, and wherein said cylinder is partially cut away intermediate its length in the region of coupling of said second shaft to said first shaft.

7. The reactive multi-axis attitude stabilization system of claim 5 wherein said resilient means on said second shaft are mounted to oppose translation of said intermediate frame in either direction along said second axis.

* * * * *

UNITED STATES PATENT AND TRADEMARK OFFICE

CERTIFICATE OF CORRECTION

PATENT NO. : 4,609,083

DATED : Sep. 2, 1986

INVENTOR(S) : Stuhler

It is certified that error appears in the above-identified patent and that said Letters Patent is hereby corrected as shown below:

Col. 7, line 22,
"shatf" should be --shaft--.

Col 7, line 30
"furth" should be --fourth--.

Col. 8, line 1
"form" should be --from--.

Signed and Sealed this

Twenty-fourth Day of March, 1987

*Attest:*

DONALD J. QUIGG

*Attesting Officer* *Commissioner of Patents and Trademarks*